US012480581B2

(12) United States Patent
Dotzer et al.

(10) Patent No.: US 12,480,581 B2
(45) Date of Patent: Nov. 25, 2025

(54) MECHANICAL SEAL ASSEMBLY COMPRISING A TORQUE METER, AND METHOD THEREFOR

(71) Applicant: EagleBurgmann Germany Gmbh & Co. KG, Wolfratshausen (DE)

(72) Inventors: Florian Dotzer, Berg (DE); Andreas Fesl, Otterfing (DE); Dieter Klusch, Penzberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 18/684,969

(22) PCT Filed: Jul. 19, 2022

(86) PCT No.: PCT/EP2022/070217
§ 371 (c)(1),
(2) Date: Feb. 20, 2024

(87) PCT Pub. No.: WO2023/030743
PCT Pub. Date: Mar. 9, 2023

(65) Prior Publication Data
US 2025/0129850 A1    Apr. 24, 2025

(30) Foreign Application Priority Data
Aug. 31, 2021   (DE) ..................... 10 2021 122 476.4

(51) Int. Cl.
*F16J 15/34*    (2006.01)
(52) U.S. Cl.
CPC ....... *F16J 15/3492* (2013.01); *F16J 15/3464* (2013.01)

(58) Field of Classification Search
CPC .. F16J 15/3464; F16J 15/3492; G01M 13/005
See application file for complete search history.

(56) References Cited

U.S. PATENT DOCUMENTS

| 4,497,493 A | * | 2/1985 | Sall | G01B 7/14 |
| | | | | 277/306 |
| 5,448,924 A | * | 9/1995 | Nagai | G01D 21/02 |
| | | | | 277/358 |

(Continued)

FOREIGN PATENT DOCUMENTS

| CN | 102183327 A | 9/2011 |
| DE | 102018206219 B3 | 9/2019 |

(Continued)

OTHER PUBLICATIONS

International Search Report issued in PCT/EP2022/070217, mailed Oct. 12, 2022.

*Primary Examiner* — Nicholas L Foster
(74) *Attorney, Agent, or Firm* — Troutman Pepper Locke LLP; Scott D. Wofsy; Gabreille L. Gelozin

(57) ABSTRACT

The invention relates to a mechanical seal assembly, comprising a mechanical seal (2) having a rotating slide ring (3) and a stationary slide ring (4) which define a sealing gap (5) between their sliding surfaces (3a, 4a), and a torque meter (6) which is configured to detect a torque acting on the stationary slide ring (4), wherein the torque meter (6) comprises a measuring unit (7) and a sensor (9), wherein the measuring unit (7) is fixed by a foot (72) to a housing (8) and comprises a free end (71) which protrudes in a groove (40) formed in an outer periphery of the stationary slide ring (4), and wherein the sensor (9) is configured to detect a position change of the measuring unit (7) in the groove (40).

12 Claims, 5 Drawing Sheets

(56) References Cited

U.S. PATENT DOCUMENTS

Figure 1:
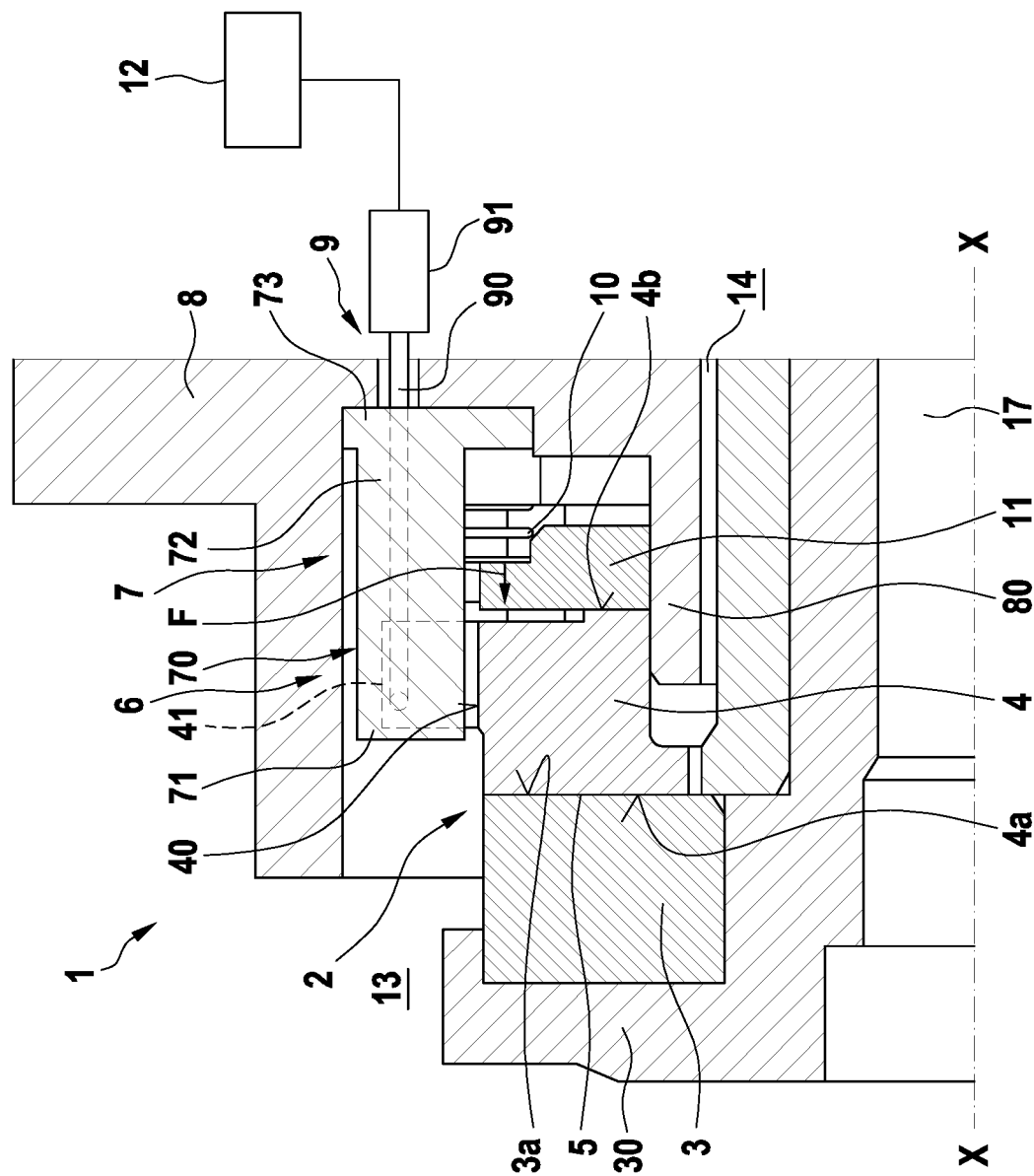

| | | | | |
|---|---|---|---|---|
| 6,626,436 B2* | 9/2003 | Pecht | ................... | F16J 15/3492 |
| | | | | 277/318 |
| 7,405,818 B2* | 7/2008 | Heinzen | ............... | F16J 15/3296 |
| | | | | 277/321 |
| 8,695,634 B2* | 4/2014 | Yashima | ............... | C04B 35/565 |
| | | | | 384/42 |
| 11,598,425 B2* | 3/2023 | Schwenk | .............. | G01M 3/002 |
| 11,885,418 B2* | 1/2024 | Schwenk | ............... | F16J 15/344 |
| 2005/0016303 A1 | 1/2005 | Jacobs et al. | | |
| 2011/0253924 A1* | 10/2011 | Yashima | ............... | F16C 33/416 |
| | | | | 384/42 |
| 2012/0112416 A1 | 5/2012 | Berger et al. | | |

FOREIGN PATENT DOCUMENTS

| | | |
|---|---|---|
| JP | H02199374 A | 8/1990 |
| JP | 2012529602 A | 11/2012 |

\* cited by examiner

MECHANICAL SEAL ASSEMBLY COMPRISING A TORQUE METER, AND METHOD THEREFOR

CROSS-REFERENCE TO RELATED APPLICATIONS

This application is a U.S. National Phase Application filed under 35 U.S.C. § 371, based on International Patent Application No. PCT/EP2022/070217, filed Jul. 19, 2022, which claims priority to German Patent Application No. 10 2021 122 476.4, filed on Aug. 31, 2021, which are incorporated herein by reference.

The present invention relates to a mechanical seal assembly comprising a torque meter, and to a method for examining wear of sliding surfaces of a mechanical seal assembly.

Mechanical seal assemblies from the prior art are known in various designs. A problem area in the case of mechanical seal assemblies is the determination of a state of wear of the sliding surfaces of the slide rings. Although during normal operation the mechanical seal is typically a contactless seal, wherein a gas cushion or a fluid cushion is provided between the sliding surfaces of the stationary and of the rotating slide ring, situations also arise during operation in which there is contact between the slide rings, for example when starting up or disconnecting the machine, or from the time of starting the machine until the sliding surfaces are raised. Pressure surges acting in the axial direction of the mechanical seal can also arise during operation, which surges establish contact between the sliding surfaces. However, such contact can damage the sliding surfaces and make it necessary for the slide rings to be replaced. It is known that for example a wear of the sliding surfaces is determined on the basis of a leakage across the sealing gap. However, it would be desirable to have alternative possibilities for determining a state of sliding surfaces.

The object of the present invention is therefore that of providing a mechanical seal assembly and a method for examining a state of wear of sliding surfaces, which enable quick and reliable determination of wear of the sliding surfaces, with a simple design and simple and cost-effective producibility.

This object is achieved by a mechanical seal assembly and a method as recited in the independent claims. The dependent claims in each case disclose preferred developments of the invention.

The mechanical seal assembly according to the invention having the features of claim 1 provides the advantage that an alternative and easy to perform wear identification on sliding surfaces of a rotating and/or stationary slide ring of a mechanical seal is possible. In particular, a direct torque measurement of a torque acting on the stationary slide ring, both in a test mode on a test bench, and in the installed state of the mechanical seal for sealing on a shaft or the like, is possible. This is achieved according to the invention in that the mechanical seal assembly comprises a mechanical seal having a rotating and a stationary slide ring which define a sealing gap between their sliding surfaces. Furthermore, a torque meter is provided, which is configured to detect a torque acting on the stationary slide ring. In this case, the torque meter comprises a measuring unit and a sensor. The measuring unit is fixed by a foot to a housing of the mechanical seal and is arranged by a free end in a groove formed in an outer periphery of the stationary slide ring. The sensor is configured to detect a position change of the measuring unit in the groove. In this case, the position change of the measuring unit is a measure for the torque exerted on the stationary slide ring. In this case, the detected torque value on the stationary slide ring indicates a state of wear of the sliding surfaces of the rotating and stationary slide ring. This can make possible simple and reliable detection of the state of the sliding surfaces, and optionally a quick replacement of the slide rings can be carried out.

In particular, the torque meter according to the invention enables a reliable torque measurement even in the case of axial movements of the stationary slide ring, which can appear by pressure surges or the like during operation. Thus, a reliable torque detection can be made possible even in the case of axially movable stationary slide rings.

The measuring unit is preferably configured as a flat rod. The measuring unit thus comprises a flat, bar-shaped rod which is fixed at one end and the length of which is greater than its cross-sectional dimensions. The cross section of the flat rod is preferably rectangular. Since the free end of the flat rod is arranged in the groove in the stationary slide ring, and the foot of the flat rod is fixed on the housing in a stationary manner, when a torque is introduced onto the stationary slide ring, the stationary slide ring moves in the peripheral direction, such that the free end of the flat rod undergoes a position change upon contact with a groove wall. Said position change is a measure for the torque introduced into the stationary slide ring, on account of which a wear of the sliding surfaces of the slide rings can then be concluded.

Preferably, in each case a protruding region, in particular a cam-shaped region, is formed on the free end, on each flat side of the flat rod. In this case, the flat rod is preferably of a width, in the groove, which is only minimally smaller than the groove width, such that when a torque is introduced into the stationary slide ring a location change of the free end of the flat rod immediately takes place. As a result, even small torques can be reliably detected.

Further preferably, the foot of the measuring unit is of a greater thickness than the free end. Preferably, the thickness at the foot of the measuring unit is twice the thickness at the free end.

The sensor of the torque meter is particularly preferably an optical sensor. In this case, the optical sensor detects position changes of the free end of the measuring unit on account of the torque introduced into the stationary slide ring. Preferably, the optical sensor is of the reflection type, which detect a light beam, for example a laser beam, reflected from the free end of the measuring unit. Alternatively, the optical sensor is an optical FBG sensor (fiber Bragg grating). The optical sensors in particular have the advantage that no electrical current is required for measuring at the measuring unit, such that they can preferably be used in sealing tasks where there is a risk of explosion, or the like. If the measuring unit is configured as a flat rod, a special reflective surface for the optical sensor is preferably formed on at least one flat side of the flat rod. In particular a measuring accuracy can be increased thereby.

Alternatively, the sensor of the torque meter is a strain gauge. Strain gauge sensors are very cost-effective to provide, and are very robust in design. Strain gauge sensors can be used for example in sealing tasks if a plurality of dust particles or the like is present, in the case of which optical measurement methods deliver only poor results.

Alternatively, the sensor of the torque meter is a piezo element. Piezo elements are also very robust and relatively cost-effective to provide. Since electric current flows in the case of piezo sensors too, the field of use is typically restricted to gaseous media in which no electrical short circuit occurs.

A particularly simple and cost-effective design is possible if the groove in the stationary slide ring extends in the axial direction of the mechanical seal assembly. The groove is thus in parallel with a central axis of a shaft that is to be sealed.

Further preferably, the stationary slide ring is preloaded in the axial direction by means of a preload device. In this case, a pressure ring is preferably provided between the preload device and the stationary slide ring. The preload device is particularly preferably a plurality of individual spring elements, which are arranged along the periphery of the mechanical seal.

Furthermore, the mechanical seal assembly preferably comprises a controller which is configured to conclude a wear of the sliding surfaces of the mechanical seal based on the detected torque on the stationary slide ring. The controller is particularly preferably configured to determine the wear of the sliding surfaces of the slide rings, depending on a magnitude of the torque. In this case, for example a threshold value for a torque can be stored in a database, and a comparison of the threshold value with the detected torque value can be performed. If the threshold value is exceeded, this indicates excessive wear of the sliding surfaces, and the controller unit can for example output a replacement signal or a replacement message or the like.

Furthermore, the controller is configured to operate the mechanical seal assembly in such a way that contact occurs at the sliding surfaces of the rotating and stationary slide ring, and the torque meter detects a contact torque arising upon contact of the sliding surfaces and concludes a wear of the sliding surfaces based on the contact torque. The determination of the torque upon contact of the sliding surfaces is particularly revealing with regard to a wear of the sliding surfaces. This can arise for example in the case of a low rotating speed of a shaft to be sealed, if there is not yet any, or not sufficient, medium present in the sealing gap for raising the sliding surfaces of the slide rings.

Further preferably, the controller unit is configured to detect a breakaway torque of the mechanical seal from a standstill of the mechanical seal. In the case of standstill of the mechanical seal, the sliding surfaces of the rotating and stationary slide ring touch. The breakaway torque is reached when the rotating slide ring begins to rotate relative to the stationary slide ring. This can be determined reliably and simply, using the torque meter according to the invention. Here, too, it is the case that the greater the breakaway torque of the mechanical seal assembly, the more wear is present at the sliding surfaces of the slide rings. When a threshold value for the breakaway torque is exceeded, then likewise an excessive wear and a necessary replacement of the slide rings can again be concluded.

The present invention furthermore relates to a method for examining wear of sliding surfaces of a mechanical seal assembly according to the invention, as described above. In this case, the method comprises the steps of detecting a torque acting on the stationary slide ring, and of comparing the detected torque with a stored threshold value for the torque. If the torque is greater than the threshold value for the torque, it is determined that there is excessive wear of the sliding surfaces. In this case, the method according to the invention enables the advantages described above.

Further preferably, in this case the method comprises the steps of operating the mechanical seal assembly at a rotating speed such that the sliding surfaces of the rotating and stationary slide ring are in contact. In this case, a contact torque arising on the stationary slide ring, upon contact of the sliding surfaces, is detected, and the detected contact torque is compared with a stored threshold value for the contact torque. If the contact torque is greater than the threshold value, it is determined that there is excessive wear of the sliding surfaces. Then, for example a signal or a message can be output, and a replacement of the slide rings can be carried out.

Particularly preferably, the method according to the invention detects a breakaway torque from a standstill of the mechanical seal, as the contact torque. The breakaway torque is as described above; in this case, the torque value at which a relative rotation of the rotating slide ring relative to the stationary slide ring begins.

Preferably, the torque at the stationary slide ring is also detected continuously during operation of the mechanical seal. Although during normal operation of the mechanical seal there is no direct contact between the slide rings at the sliding surfaces, during operation a certain torque is always exerted on the stationary slide ring, which torque also increases as a wear of the sliding surfaces increases. Therefore, the detected torque during operation is likewise an indicator for the wear of the sliding surfaces of the slide rings, and a comparison with a stored threshold value can then suggest the necessary replacement of the slide rings, when the threshold value is exceeded.

Figure 2:
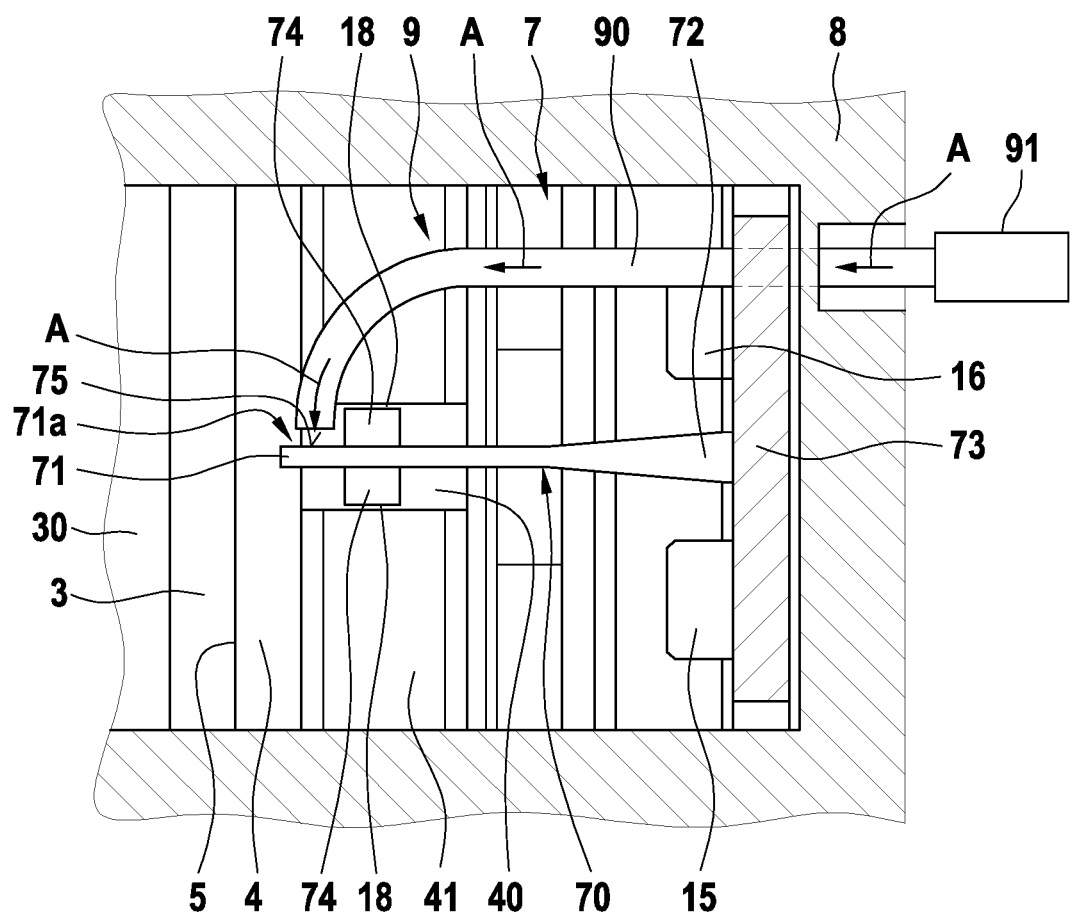
Figure 3:
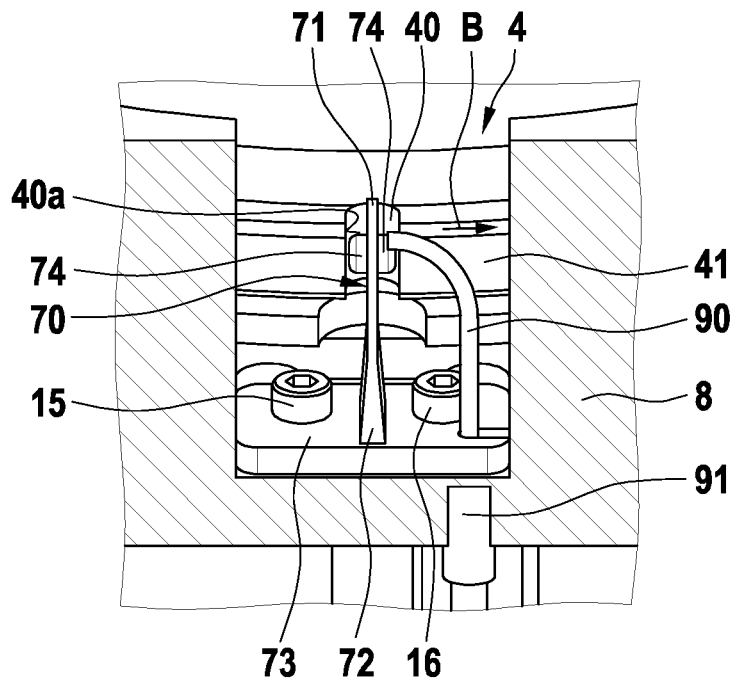
Figure 4:
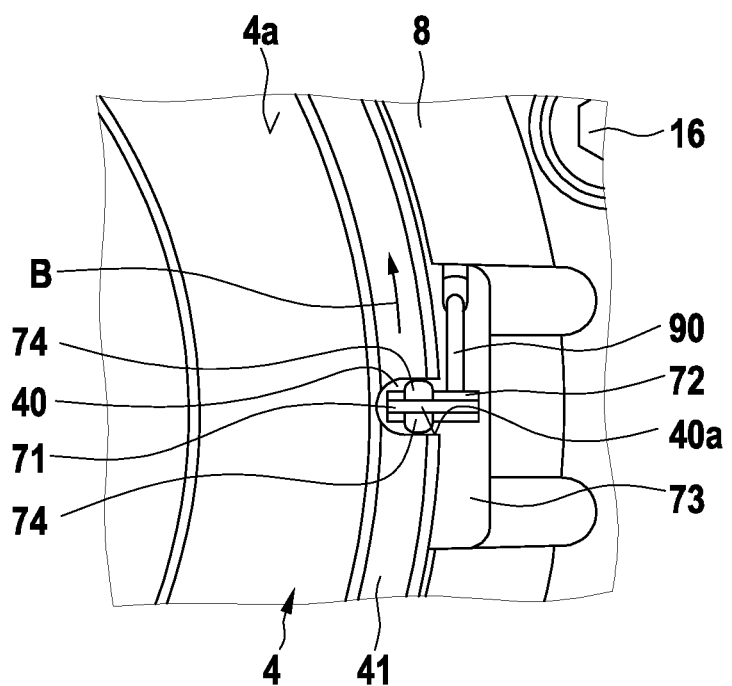
Figure 5:
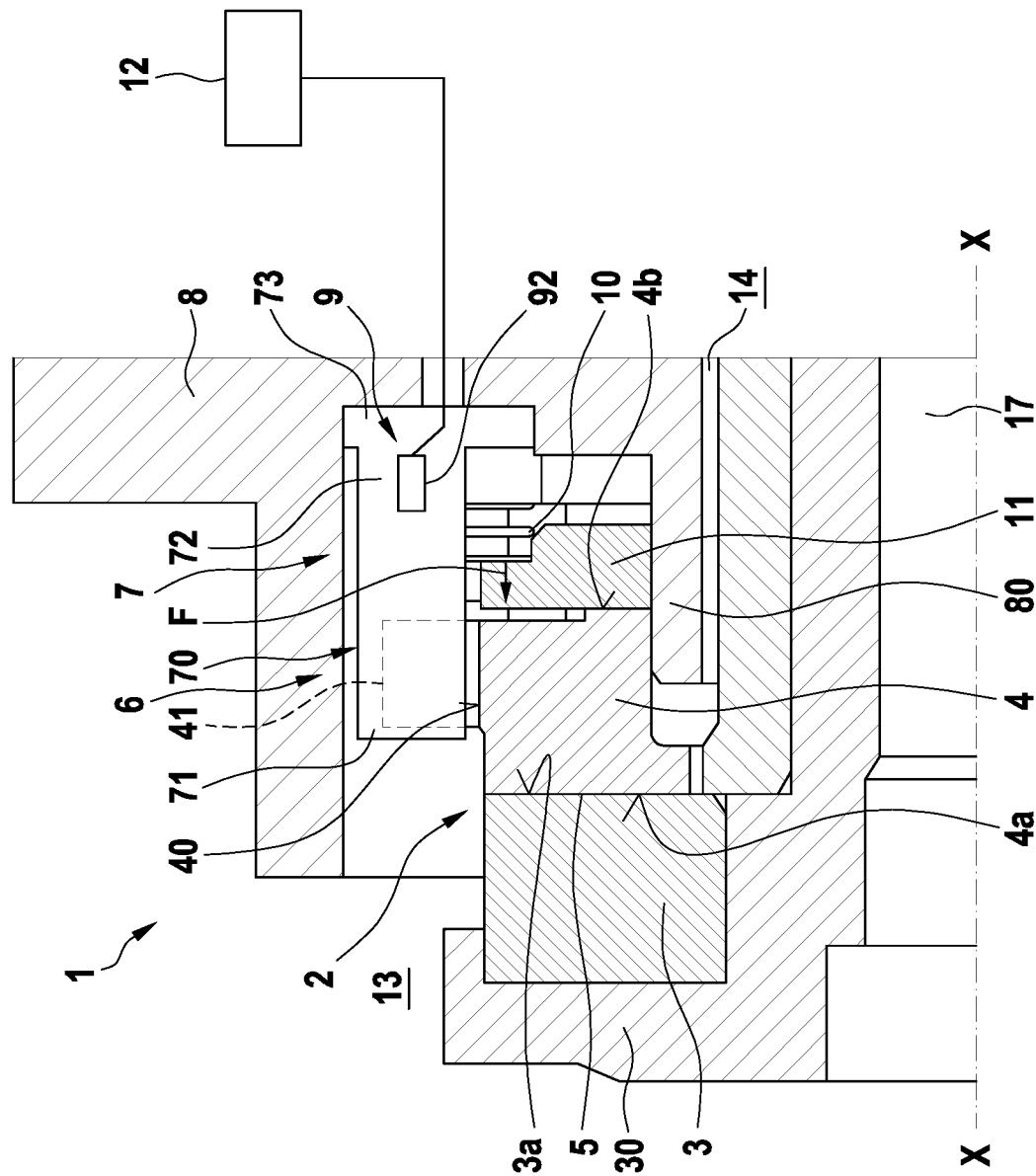
Figure 6:
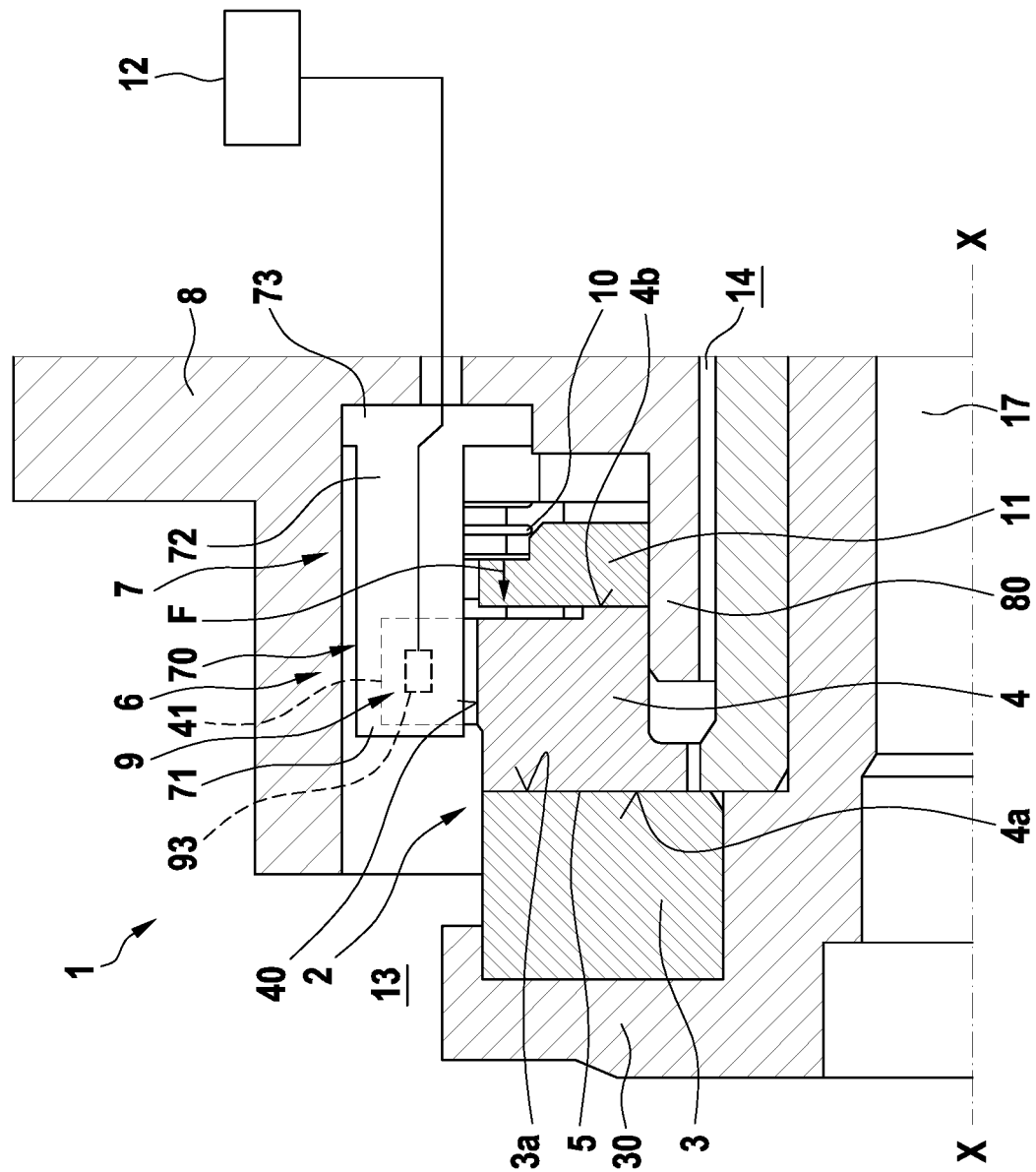

Embodiments of the invention will be described in detail in the following, with reference to the accompanying drawings, in which:

FIG. 1 is a schematic sectional view of a mechanical seal assembly according to a first embodiment of the invention, FIG. 2 is a schematic partial plan view of the mechanical seal assembly of FIG. 1, FIG. 3 is a perspective partial view of the mechanical seal assembly of FIG. 1, FIG. 4 is a partial side view of the mechanical seal assembly of FIG. 1, FIG. 5 is a schematic sectional view of a mechanical seal assembly according to a second embodiment of the invention, and FIG. 6 is a schematic sectional view of a mechanical seal assembly according to a third embodiment of the invention.

In the following, a mechanical seal assembly 1 and a method for examining wear of sliding surfaces of the mechanical seal assembly will be described in detail, with reference to FIGS. 1 to 4.

The mechanical seal assembly 1 comprises, as shown in FIG. 1, a mechanical seal 2 comprising a rotating slide ring 3 and a stationary slide ring 4. A sealing gap 5 is defined between a sliding surface 3a of the rotating slide ring 3 and a sliding surface 4a of the stationary slide ring 4. During operation, there is typically no contact between the sliding surfaces 3a, 4a of the slide rings.

In this case, the mechanical seal assembly 1 seals a product region 13 from an atmosphere region 14, at a shaft 17.

The rotating slide ring 3 is connected to the shaft 17 by means of a slide ring carrier 30, such that a rotation of the shaft is transmitted to the rotating slide ring 3 via the slide ring carrier 30.

The stationary slide ring 4 is arranged in a non-rotatable manner on a housing 8. As can be seen from FIG. 1, the housing 8 comprises a sleeve region 80 extending in the axial direction X-X of the mechanical seal assembly 1. In this case, the stationary slide ring 4 is movable on the sleeve region 80, in the axial direction X-X. A pressure ring 11 is provided on a rear side 4b of the stationary slide ring 4, which pressure ring is preloaded in the axial direction X-X, against the rotating slide ring 3, by means of preload elements 10, in particular a plurality of spring elements.

The mechanical seal assembly 1 further comprises a torque meter 6. The torque meter 6 can be seen in detail in FIGS. 1 to 4. The torque meter 6 comprises a measuring unit 7 and a sensor 9, which in this embodiment is an optical sensor. In this case, the sensor 9 comprises an optical fiber 90 and a light source/receiver assembly 91. The light/receiver assembly 91 emits a light in the optical fiber 90 and receives a corresponding reflection.

The measuring unit 7 can be seen in detail in overview from FIGS. 1 and 3. The measuring unit 7 comprises a flat rod 70, which is fastened at one end on the housing 8. In this case, the flat rod 70 is fastened at one end by means of a base plate 73, which is fixed to the housing 8 using bolts 15, 16. A free end 71 of the flat rod 70 protrudes in a groove 40 which is formed on an outer periphery of the stationary slide ring 4. A foot 72 connected to the base plate is of a greater thickness than the free end 71 (cf. FIG. 3).

As can be seen in particular from FIG. 1, the groove 40 extends in the axial direction X-X of the mechanical seal assembly 1. As is furthermore visible from FIG. 1, in this case the free end 71 extends in the axial direction X-X, proceeding from the base plate 73, through the entire groove 40, and has a small overhang beyond the groove 40, in the axial direction.

As shown in dashed lines in FIG. 1, the optical fiber 90 is also guided as far as the groove 40, wherein the optical fiber 90 has a 90°-curve (cf. FIG. 2). In this case, a reflective surface 75 is provided on a flat side 71a on the free end 71 of the flat rod 70 (cf. FIG. 2). A light beam (arrow A) emitted by the light source/receiving assembly 91 is reflected thereby, and sent back to said light source/receiving assembly.

Furthermore, regions 74 protruding on either side are provided on the flat rod 70 (cf. in particular FIGS. 2 and 3), which regions are also arranged in the groove 40. In this case, the protruding regions 74 are configured in such a way that a small gap 18 exists on both sides, with respect to the walls of the groove 40 (FIG. 2).

Since the groove 40 is formed straight and in parallel with the axial direction X-X, in the stationary slide ring 4, the stationary slide ring 4 can perform axial movements. For example, in the case of a movement of the shaft 17 to the left in FIG. 1, which also brings about a movement of the rotating slide ring 3 in the axial direction, a readjustment can be made possible by the preload force F applied by the preload element 10, via the pressure ring 11. As can be seen from FIG. 3, in this case although the torque meter 6, which is fixed to the housing 8, remains stationary, measurement recording regions of the torque meter 6 are still arranged in the groove 40 of the stationary slide ring 4.

In this case, the function and the measurement method of the torque detection device 6 is as follows. If, in normal operation of the mechanical seal assembly 1, when a medium is present in the sealing gap 5 and there is no contact between the sliding surfaces 3a, 4a of the slide rings 3, 4, a torque is exerted on the stationary slide ring 4 (which is indicated schematically in FIG. 4 by the arrow B), a groove wall 40a of the groove 40 comes into contact with the measuring unit 7, in particular one of the protruding regions 74. As a result, there is no longer any gap 18 present between the groove wall 40a and the protruding region 74. This results in a deformation of the flat rod 70, with a corresponding position change of the measuring unit 7, in particular at the free end 71, such that the sensor 9, which emits a light beam A continuously or at intervals, can detect a change of a reflection of the light beam. The reflection change can then be detected by the sensor 9. The sensor 9 is connected to a controller 12, which performs an evaluation of the sensor signal. The torque exerted on the stationary slide ring 4 can be concluded from the change in the sensor signal.

In this case, the controller 12 is furthermore configured to compare the torque value, determined in this way, with a threshold value for the torque. When the determined torque value is above the threshold value, this is a clear indication of wear on the sliding surfaces 3a, 4a, since in the case of unworn sliding surfaces 3a, 4a a torque transmission from the rotating slide ring 3 to the stationary slide ring 4 is much less than in the case of sliding surfaces which exhibit wear, for example corrugations or waves or the like.

A torque measurement can also be performed in the case of contact between the rotating slide ring and the stationary slide ring at the sliding surfaces 3a, 4a, for example in the event of a standstill of the shaft 17 or a very low rotating speed, at which there is still contact at the sliding surfaces 3a, 4a. In the case of worn slide rings, the contact between the sliding surfaces lasts longer than in the case of brand new sliding surfaces. Thus, a torque transmitted from the rotating slide ring 3 to the stationary slide ring 4 is significantly greater than in the case of brand new slide rings which exhibit no wear and no waviness. In particular, a breakaway torque can also be detected from a standstill of the shaft 17, which breakaway torque is also significantly greater in the case of worn sliding surfaces than in the case of sliding surfaces with no or only little wear.

As is furthermore visible in particular from FIGS. 1 and 4, the stationary slide ring 4 comprises a radially outwardly oriented, peripheral flange region 41, in which the groove 40 is formed. In this case, the flange region 41 does not comprise any sliding surface (cf. also FIG. 4).

The force in the peripheral direction, formed in the case of torque transmissions from the rotating slide ring 3 to the stationary slide ring 4, acts on the flat rod 70, such that said rod is loaded so as to bend, and deforms. This deformation can be detected by an optical path measurement. In this case, the controller 12 is configured for example to determine a force on the measuring unit 7 on the basis of the known material parameters of the measuring unit 7, and to then calculate the torque acting at the stationary slide ring 4 on the basis of the known slide ring geometry.

In this case, the torque acting on the stationary slide ring 4 can always be detected, irrespective of an axial position of the stationary slide ring 4, by the axial arrangement of the groove 40. The measuring unit 7 is preferably produced from stainless steel.

FIG. 5 shows a mechanical seal assembly 1 according to a second embodiment of the invention. Identical or functionally identical parts are provided with the same reference characters as in the first embodiment. The second embodiment substantially corresponds to the first embodiment, wherein in the second embodiment instead of an optical sensor a strain gauge 92 is used as the sensor 9. As shown in FIG. 5, the strain gauge 92 is arranged on the region of the foot 72 of the flat rod 70 When a torque is transmitted to the stationary slide ring 4, as in the first embodiment a force is introduced onto the free end 71 of the flat rod 70 of the measuring unit 7, such that an electrical resistance of the strain gauge 92 changes depending on the magnitude of the bending of the flat rod 70. This change can be detected by means of the controller 12, and the force acting on the measuring unit 7 on account of the torque introduced into the stationary slide ring 4 can be determined therefrom. Otherwise, this embodiment corresponds to the previous embodiment, and therefore reference can be made to the description given there. Alternatively, an optical FBG sensor can also be used at the position of the strain gauge 92.

FIG. 6 shows a mechanical seal assembly 1 according to a third embodiment of the invention. Identical or functionally identical parts are provided with the same reference characters as in the previous embodiments. In the third embodiment, a piezo sensor 93 is arranged on a groove wall 40a of the groove 40, as the sensor 9. When a torque is transmitted from the rotating slide ring 3 to the stationary slide ring 4, a force transmission to the measuring unit 7 occurs, which unit bends in particular in the region of the free end 71. As a result, a force can be exerted on the piezo sensor 93, as a result of which the electrical resistance of said sensor changes, which can be detected by the controller 12. The controller 12 can then determine the force exerted on the piezo sensor 93, and thus the torque, on the basis of the changed electrical resistance of said piezo sensor. In order to enable detection of the torque that is independent of the direction of rotation, piezo sensors 93 are preferably arranged on both groove walls of the groove 40. Otherwise, this embodiment corresponds to the previous embodiments, and therefore reference can be made to the description given there.

In this case, the method according to the invention for examining a state of wear of sliding surfaces 3a, 4a is performed in all embodiments in particular in the event of contact between the sliding surfaces of the slide rings. Thus, upon contact of the sliding surfaces a contact torque can be detected by the various sensors 9 of the torque detection device 6, which are described in the embodiments. Said contact torque is then compared with a threshold value stored in the controller 12. As soon as the contact torque is greater than the threshold value, the controller 12 then determines that there is excessive wear of the sliding surfaces 3a, 4a of the slide rings. Then, for example a signal or a message can be output here, which draws attention to the excessive wear and recommends replacement of the slide rings.

Furthermore, in particular a breakaway torque of the sliding surfaces can be detected from a standstill of the shaft 17. If the breakaway torque is also greater than a predetermined threshold value for the breakaway torque, excessive wear of the sliding surfaces can likewise be concluded, and corresponding indicators can be output by the controller 12.

LIST OF REFERENCE CHARACTERS 1 mechanical seal assembly
2 mechanical seal
3 rotating slide ring
3a sliding surface of the rotating slide ring
4 stationary slide ring
4a sliding surface of the rotating slide ring
4b rear side of the stationary slide ring
5 sealing gap
6 torque meter
7 measuring unit
8 housing
9 sensor
10 preload element
11 pressure ring
12 controller
13 product region
14 atmosphere region
15, 16 bolts
17 shaft
18 gap between groove wall and measuring unit
30 slide ring carrier
40 groove
40a groove wall
41 flange region
70 flat rod
71 free end
71a flat side
72 foot of the flat rod
73 base plate
74 protruding region
75 reflective surface
80 sleeve region
90 optical fiber
91 light source/receiver assembly
92 strain gauge
93 piezo sensor
A light beam
B force introduced into the stationary slide ring
F preload force
X-X axial direction

The invention claimed is:

1. A mechanical seal assembly, comprising: a mechanical seal including a rotating slide ring and a stationary slide ring which define a sealing gap between their sliding surfaces, and a torque meter which is configured to detect a torque acting on the stationary slide ring, wherein the torque meter includes a measuring unit and a sensor, wherein the measuring unit is fixed by a foot to a housing and has a free end which protrudes in a groove formed in an outer periphery of the stationary slide ring, and wherein the sensor is configured to detect a position change of the measuring unit in the groove,
further comprising a controller which is configured to conclude a wear of the sliding surfaces of the mechanical seal based on the detected torque on the stationary slide ring,
wherein the controller is further configured to operate the mechanical seal assembly in such a way that contact between the rotating slide ring and the stationary slide ring occurs at the sliding surfaces, and is further configured to detect a contact torque arising upon contact of the sliding surfaces, and to conclude a wear of the sliding surfaces based on the contact torque.

2. The mechanical seal assembly according to claim 1, wherein the measuring unit includes a flat rod that is fixed at one end.

3. The mechanical seal assembly according to claim 1, wherein a protruding region is formed on the free end of the measuring unit, on each side facing towards a groove wall of the groove.

4. The mechanical seal assembly according to claim 1, wherein the foot of the measuring unit is of a greater thickness than the free end.

5. The mechanical seal assembly according to claim 1, wherein the sensor is an optical sensor.

6. The mechanical seal assembly according to claim 5, wherein a reflective surface for the optical sensor is formed on the measuring unit.

7. The mechanical seal assembly according to claim 1, wherein the sensor includes a strain gauge which is arranged on the measuring unit.

8. The mechanical seal assembly according to claim 1, wherein the sensor includes a piezo sensor which is arranged in the groove, on the groove wall.

9. The mechanical seal assembly according to claim 1, wherein the groove extends in the axial direction of the mechanical seal assembly, and/or wherein the stationary slide ring is preloaded in the axial direction by means of a preload element.

10. The mechanical seal assembly according to claim 1, wherein the controller is further configured to determine the wear of the sliding surfaces based on a comparison of the detected torque value with a threshold value, if the detected torque value is greater than the threshold value.

11. A method for examining wear of sliding surfaces of the mechanical seal assembly of claim 1, comprising the steps of: operating the mechanical seal assembly, detecting a torque acting on the stationary slide ring, and comparing the detected torque with a stored threshold value for the torque, wherein, if the torque is greater than the threshold value for the torque, it is determined that there is excessive wear of the sliding surfaces, and further comprising the steps of operating the mechanical seal assembly at a rotating speed such that the sliding surfaces of the rotating slide ring and of the stationary slide ring are in contact, detecting a contact torque occurring on the stationary slide ring upon contact of the sliding surfaces, and comparing the contact torque with a stored threshold value for the contact torque, wherein, if the contact torque is greater than the threshold value for the contact torque, it is determined that there is excessive wear of the sliding surfaces.

12. The method according to claim 11, wherein a breakaway torque of the sliding surfaces is detected proceeding from a standstill of the mechanical seal and is compared with a threshold value for the breakaway torque and, if the breakaway torque is greater than the threshold value for the breakaway torque, it is determined that there is excessive wear of the sliding surfaces.

* * * * *